(12) United States Patent
Lorenc et al.

(10) Patent No.: US 11,891,334 B2
(45) Date of Patent: Feb. 6, 2024

(54) CRACK SEALANT METHOD AND COMPOSITION FOR REDUCED COLOR CONTRAST

(71) Applicant: ADVENTUS MATERIAL STRATEGIES, LLC, Daniel Island, SC (US)

(72) Inventors: Joseph J. Lorenc, Philadelphia, PA (US); Joseph Drbohlav, III, Inman, SC (US); Thomas John Haslett, Broadbeach Waters (AU)

(73) Assignee: Adventus Material Strategies, LLC, Daniel Island (SC)

( * ) Notice: Subject to any disclaimer, the term of this patent is extended or adjusted under 35 U.S.C. 154(b) by 659 days.

(21) Appl. No.: 16/984,771

(22) Filed: Aug. 4, 2020

(65) Prior Publication Data

US 2021/0206695 A1 Jul. 8, 2021

Related U.S. Application Data

(60) Provisional application No. 62/958,558, filed on Jan. 8, 2020.

(51) Int. Cl.
*C04B 26/26* (2006.01)
*C04B 24/08* (2006.01)
*C04B 14/30* (2006.01)
*C04B 40/00* (2006.01)
*C04B 111/72* (2006.01)
*C04B 111/00* (2006.01)

(52) U.S. Cl.
CPC ............ *C04B 26/26* (2013.01); *C04B 14/305* (2013.01); *C04B 14/308* (2013.01); *C04B 24/08* (2013.01); *C04B 40/0046* (2013.01); C04B 2111/0075 (2013.01); C04B 2111/00663 (2013.01); C04B 2111/72 (2013.01)

(58) Field of Classification Search
None
See application file for complete search history.

(56) References Cited

U.S. PATENT DOCUMENTS

| 4,629,754 A * | 12/1986 | Syrier .................... C08L 57/02 524/68 |
| 6,514,595 B1 * | 2/2003 | Sprouts ................... C04B 28/34 106/676 |
| 11,572,472 B2 * | 2/2023 | Majeska ................. C08L 93/04 |
| 2010/0233146 A1 | 9/2010 | McDaniel |
| 2014/0083331 A1 | 3/2014 | Fini |
| 2017/0008803 A1 * | 1/2017 | Muncy .................. C08L 95/005 |
| 2017/0191008 A1 * | 7/2017 | Baseeth ................ C09K 8/035 |
| 2018/0201716 A1 * | 7/2018 | Kameda ................ C09J 125/10 |
| 2018/0215919 A1 * | 8/2018 | Reinke .................... C08L 95/00 |
| 2019/0177925 A1 | 6/2019 | Kriech et al. |
| 2019/0226159 A1 | 7/2019 | Marienfeld et al. |
| 2019/0256417 A1 | 8/2019 | Stepp et al. |
| 2023/0143069 A1 * | 5/2023 | Majeska ................. C08L 93/04 524/62 |

OTHER PUBLICATIONS

PCT International Search Report and Written Opinion; PCT/US2020/044876; dated Oct. 8, 2020; US.
Crumb Rubber; Wikipedia (https://en.wikipedia.org/wiki/Crumb_rubber>]); p. 2; US.

* cited by examiner

*Primary Examiner* — John J Figueroa
(74) *Attorney, Agent, or Firm* — Dennis D. Brown; Brown Patent Law, P.L.L.C.

(57) ABSTRACT

A pigmented asphaltic sealant composition and methods of preparing and using the sealant composition which eliminate or reduce a color contrast between the sealant composition and the road, pavement, or other substrate surface to which the sealant composition is applied.

12 Claims, No Drawings

CRACK SEALANT METHOD AND COMPOSITION FOR REDUCED COLOR CONTRAST

RELATED CASE

This application claims the benefit of U.S. Provisional Patent Application Ser. No. 62/958,558 filed on Jan. 8, 2020 and incorporates said provisional application by reference into this document as if fully set out at this point.

FIELD OF THE INVENTION

The present invention relates to a crack sealant composition for sealing cracks in roads and highways that has a modified color so that there is less contrast in color between the sealant and the pavement surface. The present invention also relates to methods of producing and using the crack sealant composition.

BACKGROUND OF THE INVENTION

A need exists for a crack sealant composition and method that would be effective for sealing cracks and joints without creating excessive contrast in color between the sealant material and the underlying pavement substrate. Commonly used crack sealants are typically formulated using asphalt or bitumen and therefore have a deep black color that creates a significant visual contrast with the underlying concrete or aged (oxidized) asphalt pavement surface. This contrast is unappealing and can interfere with the ability of automobile self-driving or self-steering sensor systems to identify lane markings.

A need also exists for a crack sealant composition and method that (a) would be effective for sealing cracks and joints in reddish pavement substrates, such as, e.g., pavements formed of red granite aggregates, and (b) would match or would not greatly contrast with the color of these reddish pavements.

SUMMARY OF THE INVENTION

The present invention alleviates the problems and satisfies the needs mentioned above. In one aspect, there is provided a sealant composition that preferably comprises asphalt, one or more polymers, crumb rubber, plasticizing oils, and a pigment, preferably rutile titanium oxide or iron (III) oxide, which causes the color of the resulting sealant composition to have less contrast to an aged asphalt, concrete, aggregate or other pavement substrate on which the sealant composition is used. In another aspect, there is provided a process for producing the inventive sealant which optimizes the dispersion and effectiveness of the pigment in the sealant composition to create the best optical effect in terms of minimizing contrast with the pavement substrate.

In another aspect, there is provided an asphaltic sealant composition which preferably comprises: (a) a base asphalt material in an amount in a range of from 50% to 89% by weight based upon a total weight of the asphaltic sealant composition; (b) a pigment in an amount in a range of from 10% to 30% by weight based upon the total weight of the asphaltic sealant composition; and (c) an epoxidized ester of a vegetable oil in an amount in a range of from % to 5% by weight based upon the total weight of the asphaltic sealant composition.

In another aspect, the asphaltic sealant composition preferably also comprises one or more of: (i) the pigment being rutile titanium dioxide or iron (III) oxide; (ii) the epoxidized ester of the vegetable oil being present in an amount of from 2% to 5% by weight based upon the total weight of the asphaltic sealant composition; (iii) a radial SBS polymer and/or a linear SBS polymer in a total amount in a range of from 3% to 8% by weight based upon the total weight of the asphaltic sealant composition; and/or (iv) crumb rubber in an amount in a range of from 3% to 8% by weight based upon the total weight of the asphaltic sealant composition.

In another aspect, there is provided a method of preparing an asphaltic sealant composition to eliminate or reduce a color contrast between the asphaltic sealant composition and a substrate. The method preferably comprises the steps of: (a) preparing a concentrate composition comprising (i) an amount of a pigment in a concentration in a range of from 30% to 45% by weight based upon a total weight of the concentrate composition. (ii) an amount of an epoxidized ester of a vegetable oil in a concentration in a range of from 4% to 10% by weight based upon the total weight of the concentrate composition, and (iii) an amount of a base asphalt material in a concentration in a range of from 45% to 66% by weight based upon the total weight of the concentrate composition; (b) mixing the concentrate composition using a mixer operating at less than 750 rpm; (c) adding at least an additional amount of the base asphalt material to the concentrate composition sufficient to form a final asphaltic sealant composition in which the concentration of the pigment material is reduced to an amount in a range of from 10% to 25% by weight based upon a total weight of the final asphaltic sealant composition; and (d) mixing the final sealant composition using a mixer operating at less than 750 rpm.

In another aspect, the method preferably additionally comprises one or more of: (i) the pigment being rutile titanium dioxide or iron (III) oxide; (ii) the epoxidized ester of a vegetable oil being an epoxidized ester of soybean oil; (iii) also adding a radial SBS polymer and/or a linear SBS polymer in step (c) in a total amount in a range of from 3% to 8% by weight based upon the total weight of the final asphaltic sealant composition; (iv) also adding crumb rubber in step (c) in an amount in a range of from 3% to 8% by weight based upon the total weight of the final asphaltic sealant composition; and/or (v) a further step, after step (d), of applying the final asphaltic sealant composition to a crack or joint in the substrate.

Further aspects, features, and advantages of the present invention will be apparent to those in the art upon reading the following detailed description of the preferred embodiments.

DETAILED DESCRIPTION OF THE PREFERRED EMBODIMENTS

In the composition and method of the present invention, a pigment is incorporated in an asphaltic crack sealant composition in an amount and in a manner effective to produce a color of the inventive crack sealant composition which is significantly more similar to, and/or has less of a contrast to, the color of the aged asphalt, aggregate, or concrete road, pavement, or other substrate surface to which the inventive crack sealant is applied.

Examples of pigments suitable for use in the inventive asphaltic crack sealant composition for aged and other asphalt or concrete substrates include, but are not limited to, rutile titanium dioxide, anatase titanium dioxide, antimony trioxide, barium sulfate, lead (II) carbonate, and zinc oxide. These pigments are referred to herein as Group I pigments.

The Group I pigment preferred for use in the inventive sealant composition for matching, or at least reducing the amount of visual contrast with, the coloration of typical asphalt or concrete substrates is rutile titanium oxide.

Examples of pigments suitable for use in the inventive sealant composition for aged road, pavement, or other substrate surfaces having a red coloration include, but are not limited to, those from iron oxides, and the hydrates of iron oxide salts. These pigments are referred to herein as Group II pigments. Red pigments from iron oxide are commonly referred to in the industry as "iron red oxide" or simply "Pigment Red." The Group II pigment preferred for use in the inventive composition for matching, or at least reducing the amount of visual contrast with, the coloration of reddish substrates is iron (III) oxide.

The asphaltic composition to which the Group I or Group II pigment is added preferably comprises a base asphalt and one or more additives of the type used in sealant compositions. The base asphalt can generally be any viscosity, penetration, or Performance Graded (PG) asphalt using the Performance Grading AASHTO asphalt specification. Examples of suitable base asphalt materials include, but are not limited to, asphalts graded as PG 64-22, PG 58-28, PG 67-22, AC-5, AC-10, AC-20, AC-30, 40-60 pen, 60-70 pen, 85-100 pen, or 120-150 pen.

Examples of additives suitable for use in the sealant composition include, but are not limited to, radial Styrene-butadiene-Styrene (SBS) polymers, linear SBS polymers, elastomers including ethylene vinyl acetate (EVA) copolymers, polyethylene, polypropylene, and terpolymers of ethylene and butyl acrylate containing glycidyl methacrylate comonomer, available as "Elvaloy" or "Lotader". Suitable additives also include recycled tire rubber or "crumb rubber" of various mesh or particle sizes.

As mentioned above, for matching or reducing the amount of contrast with the color of most aged asphalt or other pavement materials, the Group I pigment used in the inventive composition will preferably be rutile, which is a form of the mineral titanium dioxide ($TiO_2$). When dispersed in asphalt in accordance with the present invention, rutile $TiO_2$, or other Group I pigment used in the inventive composition, will modify the deep, jet black color of the asphalt. The dispersed rutile $TiO_2$ or other Group I pigment changes the visual appearance of the asphalt from jet black to various shades of brown (i.e., dark brown to light brown to tan). The resulting shade of brown depends upon the amount (weight %) of the $TiO_2$ or other Group I pigment added to the asphalt, and the degree to which the particles are dispersed in the asphalt. Better dispersion of the rutile $TiO_2$ or other Group I pigment in the asphalt composition gives better reflection of light from the rutile or other particles, which results in an overall lighter brown color.

We have discovered that the use of from about 10% to about 30% by weight rutile $TiO_2$ or other Group I pigment (based upon the total weight of the inventive sealant composition) in the inventive composition can provide an acceptable shade of brown that creates less contrast with pavement substrates. More preferably, from about 15% to about 25% of rutile $TiO_2$ or other Group I pigment will be added to the asphalt composition to affect a good balance of color and resistance to sedimentation. Most preferably, the amount of rutile $TiO_2$ or other Group I pigment added to the asphalt will be in the range of from about 18% to about 22% by weight in order to optimize color and resistance to sedimentation.

Similarly, when using iron (III) oxide or other Group II pigments, the pigment will preferably be present in the inventive reddish sealant composition in an amount of from 10% to 30%, more preferably from 15% to 25% and more preferably from 18% to 22%, by weight based upon the total weight of the final composition.

Rutile $TiO_2$, as well as at least most of the other Group I or II pigments, are much denser than asphalt and will therefore tend to settle-out of the asphalt or form a sediment if not suitably dispersed. In terms of dispersion, high shear and/or high speed mixing creates a better dispersion of $TiO_2$ or other pigment particles in the asphalt, as compared to using low shear or "paddle" blending, and is therefore a preferred technique for use in the inventive method. High shear mixing can more effectively overcome the forces of attraction between adjacent $TiO_2$ or other pigment particles, thereby breaking up and dispersing $TiO_2$ or other pigment agglomerates into separate particles to provide more surface area for scattering (reflecting) light.

As used herein, the term "high speed and/or high shear" means the use of mixing equipment that provides high rates of rotation of typically in excess of 1000 rotations per minute (rpm) and more typically in excess of 2000 rpm. The high shear mixing also forces the material through a small or narrow gap, thus imparting relatively high levels of shear stress to the material and helping to break apart and disperse agglomerations.

Examples of devices and systems suitable for high speed and/or high shear mixing of the inventive composition include, but are not limited to, Silverson® laboratory mixers with high shear milling heads, rotor-stator mills, and Cowles mixers. The high speed and/or high shear mixing of the inventive composition will preferably be conducted at a temperature in the range of from about 150° C. to about 225° C., more preferably from about 170° C. to about 200° C., and at mixing speeds in excess of 1000 rpm and more preferably in excess of 2000 rpm. This mixing is continued until full homogeneity and consistent color is achieved, preferably for a minimum of one hour and more preferably for a minimum of 2 hours.

Unfortunately, because the rutile $TiO_2$ or other Group I or II pigments used in the inventive composition are very hard and abrasive materials, they can cause significant mechanical wear when using high cost milling equipment with tight engineering tolerances. For this reason, it would also be of great benefit if the $TiO_2$ or other pigment could alternatively be dispersed using a standard, lower cost, and lower energy mixer such as provided by a simple, low shear and low rpm paddle stirrer or agitator. Typically, these mixers impart lower shear levels to the blend and rotate at rates of less than 1000 rpm and more typically less than 500 rpm.

Consequently, in accordance with an alternative low speed embodiment of the inventive method, we have discovered that by first preparing a $TiO_2$, iron (III) oxide, or other pigment concentrate at higher levels of the $TiO_2$ or other pigment in a smaller amount of the base asphalt material, sufficient particle-to-particle shear can be achieved at low speed mixing conditions to adequately disperse the $TiO_2$ or other pigment material in the asphalt to create the color effect desired while also minimizing the propensity of the $TiO_2$ or other pigment to settle-out. The concentration of the rutile $TiO_2$, iron (III) oxide, or other pigment in the concentrate will preferably be in the in the range of from about 30% to about 45% by weight, more preferably from about 35% to about 45% by weight and more preferably in the range of from about 36% to about 40% by weight, based on the total weight of the concentrate composition.

As used herein, the term "low speed" means a speed of less than 1000 rpm, more preferably less than 750 rpm, more preferably 500 rpm or less, and more preferably less than 500 rpm, and includes agitators or mixers of a simple, low speed design using unsophisticated paddles or blades to impart mixing to the blend.

Furthermore, we have discovered that modifying the rutile $TiO_2$, iron (III) oxide or other pigment used to produce the pigment concentrate with an epoxidized ester of a vegetable oil enhances the dispersion of the pigment and helps to prevent or reduce sedimentation. Without being bound by theory, the inventors believe that the epoxidized ester of the vegetable oil is attracted to the surface of the titanium dioxide or other particles, creating a surface layer of bound molecules that resists the re-agglomeration of the dispersed titanium dioxide or other particles.

Examples of epoxidized esters of vegetable oils suitable for use in the pigment concentrate include, but are not limited to, epoxidized esters of soybean oil, corn oil, tall oil, and sunflower oil. The epoxidized ester of vegetable oil will preferably an epoxidized ester of soybean oil and will most preferably be an epoxy functionalized methyl ester of soybean oil. Examples of other epoxidized esters of soybean oil suitable for use in the present invention include, but are not limited to, benzyl, propyl, and ethyl esters of soybean oil.

The epoxy functionalized ester of vegetable oil used in the low speed alternative method and composition will preferably be present in an amount in the range of from about 1% to about 10% by weight of the total weight of the pigment concentrate composition. More preferably, the epoxidized ester of vegetable oil will be present in the concentrated pigment composition, during the pigment dispersion step, at a concentration of from about 4% to about 8% by weight. An example of an epoxy functionalized methyl ester of soybean oil preferred for use in the inventive method is EMS-100, a product produced by ACS of Indiana.

To form the final sealant composition in accordance with the inventive low speed method, the concentrated pigment composition is preferably mixed with a "let down" composition which comprises the remaining amounts of the base asphalt material and additives needed to arrive at substantially the same final asphalt and pigment concentrations as described above for the high speed and/or high shear embodiment of the inventive composition. The "let down" composition can be added to the concentrated pigment composition as a single blend of all of the "let down" components or can be added as one or more components at a time, preferably beginning with the remaining amount of the base asphalt material.

More preferably, the final sealant composition produced by the inventive low speed method using a concentrated pigment composition will comprise: from about 10% to about 30% by weight rutile $TiO_2$, iron (III) oxide or other suitable pigment material; from about 1% to about 5% by weight of the epoxidized ester of vegetable oil; and from about 50% to about 89% by weight of the base asphalt. More preferably, the final sealant composition produced by the inventive low speed method using a concentrated pigment composition will comprise: from about 15% to about 25% by weight rutile $TiO_2$, iron (III) oxide, or other suitable pigment material; from about 2% to about 4% by weight of the epoxy functionalized ester of vegetable oil; and from about 55% to about 75% by weight of the base asphalt.

The final sealant composition will also preferably comprise: (i) from 3% to 8% by weight of a radial or linear SBS polymer or a mixture of radial and linear SBS polymers and (ii) from 3% to 8% by weight of a 30 or 40 mesh crumb rubber. More preferably, the final sealant composition will comprise from 5% to 7% by weight of a radial SBS polymer, or a radial and linear SBS polymer blend, and from 5% to 7% by weight of a 30 or 40 mesh crumb rubber.

Examples of suitable low speed mixing devices or systems preferred for use in dispersing the $TiO_2$, iron (III) oxide, or other pigment material in the initial pigment concentrate composition and for mixing the pigment concentrate composition with the "let down" blend to form the final sealant composition include, but are not limited to, low speed paddle mixers or agitators.

In the low speed embodiment of the inventive method, the $TiO_2$, iron (III) oxide, or other suitable pigment is preferably dispersed in the concentrate composition at a temperature in the range of from about 150° C. to about 225° C., more preferably from about 170° C. to about 200° C., at 50-500 rpm for a period of time sufficient to result in complete homogeneity of the blend, typically a minimum of one hour and more preferably a minimum of 2 hours. Subsequently, the mixing of the pigment concentrate composition with the "let down" blend is preferably conducted at a temperature in the range of from about 150° C. to about 225° C., more preferably from about 170° C. to about 200° C., at 50-500 rpm for a period of time sufficient to result in complete homogeneity of the blend, typically a minimum of one hour and more preferably a minimum of 2 hours.

The following examples are provided for illustration purposes and are not intended to limit the invention in any way.

Example 1

A low shear pigment concentrate was produced using 40% by weight of rutile $TiO_2$ that had been surface treated with zirconia alumina to enhance the dispersion of the $TiO_2$ in non-polar media. The remainder of the pigment concentrate comprised base asphalt graded as PG 64-22 using the Performance Grading AASHTO asphalt specification. The PG 64-22 base asphalt comprised about 52.4% by weight of the pigment concentrate composition. EMS-100 (an epoxidized methyl ester of soybean oil) manufactured by ACS of Indiana comprised the remaining 7.6% of the pigment concentrate.

The pigment concentrate was stirred using a simple laboratory paddle mixer for 2 hours at about 177° C. until a dispersion of uniform color and consistency was achieved. The resulting pigment concentrate was then diluted with additional PG 64-22 asphalt, radial SBS polymer, and crumb rubber to provide the final sealant composition. The amount of the pigment concentrate used was 55% by weight of the final sealant composition. The additional asphalt, polymer, and crumb rubber constituted the "letdown blend" and comprised the remaining 45% by weight of the final blend. The "letdown blend" comprised 77.8% by weight of PG 64-22 dilution asphalt, 13.3% by weight of radial Styrene-butadiene-Styrene (SBS) polymer type LG 411, and 8.9% by weight of a 40 mesh crumb rubber.

The combined pigment concentrate and "letdown blend" was stirred with a simple laboratory paddle mixer at 177-180° C. until a uniform and homogeneous blend was formed. The final sealant composition comprised 63.8% by weight PG 64-22 base asphalt, 22.0% by weight $TiO_2$, 4.2% by weight epoxidized methyl ester of soybean oil, 6.0% by weight radial SBS polymer, and 4.0% by weight crumb rubber and is referred to hereinafter as Sample 1. Sample 1 demonstrated acceptable properties and performance as summarized below in Table 2.

Example 2

A low shear pigment concentrate was produced using 40% by weight of rutile $TiO_2$ that had been surface treated with zirconia alumina to enhance the dispersion of the TiO$_2$ in non-polar media. The remainder of the pigment concentrate comprised (a) a base asphalt graded as PG 64-22 using the Performance Grading AASHTO asphalt specification and (b) EMS-100 (an epoxidized methyl ester of soybean oil) manufactured by ACS of Indiana. The PG 64-22 comprised about 53.6% by weight of the pigment concentrate with the epoxidized methyl ester of soybean oil comprising the remaining 6.4% by weight.

The pigment concentrate was stirred using a simple laboratory paddle mixer for 2 hours at about 177° C. until a dispersion of uniform color and consistency was achieved. Despite the lower level of epoxidized methyl ester of soybean oil used in this Example, the pigment concentrate had acceptable homogeneity.

The pigment concentrate was then diluted with a "letdown blend" comprising 75.6% by weight PG 64-22 dilution asphalt, 13.3% radial Styrene-butadiene-Styrene (SBS) polymer type 411, and 11.1% of 40 mesh crumb rubber to provide a final sealant composition. The resulting final sealant composition comprised: (a) 55% by weight of the pigment concentrate and (b) 45% by weight of the "letdown blend". The higher level of crumb rubber in this composition was believed to provide enhanced absorption of the epoxidized methyl ester of soybean oil, thereby helping to reduce the tackiness of the final sealant composition.

The combined pigment concentrate and "letdown blend" were stirred using a simple laboratory paddle mixer at 177-180° C. until a uniform and homogeneous blend was formed. The final sealant composition comprised 63.5% by weight PG 64-22 base asphalt, 22.0% by weight TiO$_2$, 3.5% by weight epoxidized methyl ester of soybean oil, 6.0% by weight radial SBS polymer, and 5.0% by weight crumb rubber and is referred to hereinafter as Sample 2. Sample 2 showed acceptable properties and performance as summarized below in Table 2, and was less tacky than Sample 1.

Example 3

A low shear pigment concentrate was produced using 40% by weight of rutile TiO$_2$ that had been surface treated with zirconia alumina to enhance the dispersion of the TiO$_2$ in non-polar media. The remainder of the pigment concentrate comprised (a) a base asphalt graded as PG 64-22 using the Performance Grading AASHTO asphalt specification and (b) EMS-100 (an epoxidized methyl ester of soybean oil) manufactured by ACS of Indiana. The PG 64-22 comprised about 54.5% by weight of the pigment concentrate with the epoxidized methyl ester of soybean oil comprising the remaining 5.5% by weight.

The pigment concentrate was stirred using a simple laboratory paddle mixer for 2 hours at about 177° C. until a dispersion of uniform color and consistency was formed. Despite the lower level of epoxidized methyl ester of soybean oil used in this Example, the pigment concentrate had acceptable homogeneity.

The pigment concentrate was then diluted with a "letdown blend" comprising 75.6% by weight PG 64-22 dilution asphalt, 13.3% by weight radial Styrene-butadiene-Styrene (SBS) polymer type 411, and 11.1% by weight 40 mesh crumb rubber to provide a final sealant composition. The final sealant composition comprised: (a) 55% by weight of the pigment concentrate and (b) 45% by weight of the "letdown blend". The higher level of crumb rubber was believed to provide enhanced absorption of the epoxidized methyl ester of soybean oil, thereby helping to reduce the tackiness of the final sealant composition.

The combined pigment concentrate and "letdown blend" were stirred with a simple laboratory paddle mixer under low shear at 177-180° C. until a uniform and homogeneous blend was formed. The final sealant composition comprised 64.0% by weight PG 64-22 base asphalt, 22.0% by weight TiO$_2$, 3.0% by weight epoxidized methyl ester of soybean oil, 6.0% by weight radial SBS polymer, and 5.0% by weight crumb rubber and is referred to hereinafter as Sample 3. Sample 3 showed acceptable properties and performance as summarized below in Table 2 and was slightly less tacky than Sample 1.

Example 4

A low shear, red pigment concentrate was first produced using 35.6% by weight of iron (III) oxide. The remainder of the red pigment concentrate comprised PG 64-22 base asphalt (58% by weight) and EMS-100 (5.5% by weight). The pigment concentrate was stirred using a laboratory paddle mixer at 500 RPM for 2 hours at 177° C. until a deep, dark red dispersion of uniform color and consistency was formed.

The pigment concentrate was then diluted with additional PG 64-22 base asphalt and a blend of radial and linear SBS polymers was added. The diluted composition was mixed using the laboratory mixer. When the SBS polymer blend was fully digested, 40-mesh crumb rubber was added and the stirring was continued for another 2 hours at 191° C. The final sealant composition (referred to hereinafter as Sample 4) comprised: 20% by weight of the iron (III) oxide red pigment; 68.5% by weight PG 64-22 base asphalt; 5.5% by weight of the SBS polymer blend; 3% by weight EMS-100; and 3% by weight 40-mesh crumb rubber. The iron (III) oxide pigment used in Sample 4 gave the sealant a deep, dark red color. Sample 4 showed acceptable properties and performance as summarized below in Table 2.

TABLE 1

Preferred Embodiments of the Invention

| Sample | Mass % Pigment | Pigment Type | Mass % SBS | Mass % EMS-100** | Mass % Crumb Rubber |
|---|---|---|---|---|---|
| 1 | 22 | TiO$_2$ | 6 | 4.2 | 4 |
| 2 | 22 | TiO$_2$ | 6 | 3.5 | 5 |
| 3 | 22 | TiO$_2$ | 6 | 3 | 5 |
| 4 | 20 | Iron (III) Oxide | 5.5 | 3 | 3 |
| Black, prior art sealant | 0 | None | 7 | 1 | 7 |

Note:
Balance of weight % composition is base asphalt PG 64-22 or AC-20
**EMS-100 is an Epoxidized Methyl Ester of Soybean Oil

TABLE 2

Physical Properties of the Embodiments of the Invention

| Sample | Rotational Viscosity 177° C. (cPs) | Rotational Viscosity 200° C. (cPs) | R&B Soft Point (° F.) | R&B Soft Point (° C.) | DSR MSCR, 76° C., 3.2 kPa, Jnr (1/kPa) | 4° C. Ductility (cm) |
|---|---|---|---|---|---|---|
| 1 | 3362 | 2150 | 207 | 97 | 0.5437 | 52 |
| 2 | 5250 | 2750 | 210 | 99 | 0.1961 | 34 |
| 3 | 4687 | 2562 | 216 | 102 | 0.1342 | 30.5 |

TABLE 2-continued

Physical Properties of the Embodiments of the Invention

| Sample | Rotational Viscosity 177° C. (cPs) | Rotational Viscosity 200° C. (cPs) | R&B Soft Point (° F.) | R&B Soft Point (° C.) | DSR MSCR, 76° C., 3.2 kPa, Jnr (1/kPa) | 4° C. Ductility (cm) |
|---|---|---|---|---|---|---|
| 4 | 2588 | 1475 | 206 | 96.5 | N/A | N/A |
| Black, prior art sealant | 8450 | 3950 | 249 | 121 | 0.0175 | N/A |

Thus, the present invention is well adapted to carry out the objects and attain the ends and advantages mentioned above as well as those inherent therein. While presently preferred embodiments have been described for purposes of this disclosure, numerous changes and modifications will be apparent to those in the art. Such changes and modifications are encompassed within this invention as defined by the claims.

What is claimed is:

1. An asphaltic sealant composition comprising:
    asphalt in an amount in a range of from 50% to 89% by weight based upon a total weight of the asphaltic sealant composition, the asphalt having a jet black color;
    a pigment dispersed in the asphalt in an amount in a range of from 10% to 30% by weight based upon the total weight of the asphaltic sealant composition, and at a degree of dispersion, which changes the jet black color of the asphalt to a color ranging from dark brown to light brown or tan; and
    an epoxidized ester of a vegetable oil in an amount in a range of from 1% to 5% by weight based upon the total weight of the asphaltic sealant composition which increases dispersion and reduces sedimentation of the pigment in the asphalt.

2. The asphaltic sealant composition of claim 1 comprising the epoxidized ester of the vegetable oil being an epoxidized ester of soybean oil.

3. The asphaltic sealant composition of claim 1 comprising the pigment being rutile titanium dioxide.

4. The asphaltic sealant composition of claim 1 further comprising:
    a radial SBS polymer and/or a linear SBS polymer in a total amount in a range of from 3% to 8% by weight based upon the total weight of the asphaltic sealant composition and/or
    crumb rubber in an amount in a range of from 3% to 8% by weight based upon the total weight of the asphaltic sealant composition.

5. The asphaltic sealant composition of claim 4 comprising:
    the epoxidized ester of the vegetable oil being an epoxidized ester of soybean oil;
    the pigment being rutile titanium dioxide;
    the pigment being present in an amount of from 15% to 25% by weight based upon the total weight of the asphaltic sealant composition;
    the epoxidized ester of soybean oil being present in an amount of from 2% to 5% by weight based upon the total weight of the asphaltic sealant composition;
    the radial SBS polymer and/or the linear SBS polymer being present in a total amount of from 3% to 8% by weight based upon the total weight of the asphaltic sealant composition; and
    the crumb rubber being present in an amount of from 3% to 8% by weight based upon the total weight of the asphaltic sealant composition.

6. The asphaltic sealant composition of claim 5 comprising the epoxidized ester of soybean oil being an epoxy functionalized methyl ester of soybean oil.

7. An asphaltic sealant composition comprising:
    asphalt in an amount in a range of from 50% to 89% by weight based upon a total weight of the asphaltic sealant composition, the asphalt having a jet black color;
    a pigment dispersed in the asphalt in an amount in a range of from 10% to 30% by weight based upon the total weight of the asphaltic sealant composition, and at a degree of dispersion, which changes the jet black color of the asphalt to a red color; and
    an epoxidized ester of a vegetable oil in an amount in a range of from 1% to 5% by weight based upon the total weight of the asphaltic sealant composition which increases dispersion and reduces sedimentation of the pigment in the asphalt.

8. The asphaltic sealant composition of claim 7 further comprising the epoxidized ester of the vegetable oil being an epoxidized ester of soybean oil.

9. The asphaltic sealant composition of claim 7 further comprising the pigment being iron (III) oxide.

10. The asphaltic sealant composition of claim 7 further comprising:
    a radial SBS polymer and/or a linear SBS polymer in a total amount in a range of from 3% to 8% by weight based upon the total weight of the asphaltic sealant composition and/or
    crumb rubber in an amount in a range of from 3% to 8% by weight based upon the total weight of the asphaltic sealant composition.

11. The asphaltic sealant composition of claim 10 further comprising:
    the epoxidized ester of the vegetable oil being an epoxidized ester of soybean oil;
    the pigment being iron (III) oxide;
    the pigment being present in an amount of from 15% to 25% by weight based upon the total weight of the asphaltic sealant composition;
    the epoxidized ester of soybean oil being present in an amount of from 2% to 5% by weight based upon the total weight of the asphaltic sealant composition;
    the radial SBS polymer and/or the linear SBS polymer being present in a total amount of from 3% to 8% by weight based upon the total weight of the asphaltic sealant composition; and
    the crumb rubber being present in an amount of from 3% to 8% by weight based upon the total weight of the asphaltic sealant composition.

12. The asphaltic sealant composition of claim 11 further comprising the epoxidized ester of soybean oil being an epoxy functionalized methyl ester of soybean oil.

* * * * *